Figure 1:
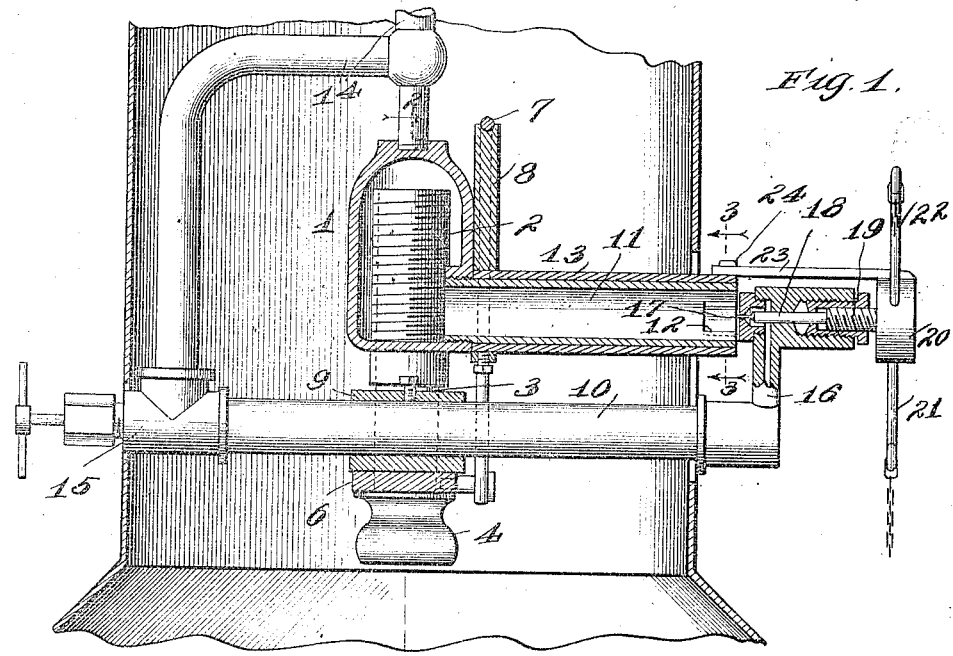

C. K. HARDING.
HYDROCARBON LIGHTING SYSTEM.
APPLICATION FILED SEPT. 24, 1910.

983,227.

Patented Jan. 31, 1911.

Witnesses:
J. A. Pauberschmidt
G. V. Domarus Jr.

Inventor:
Charles Knox Harding

UNITED STATES PATENT OFFICE.

CHARLES KNOX HARDING, OF CHICAGO, ILLINOIS.

HYDROCARBON LIGHTING SYSTEM.

983,227.

Specification of Letters Patent.   Patented Jan. 31, 1911.

Application filed September 24, 1910.   Serial No. 583,683.

*To all whom it may concern:*

Be it known that I, CHARLES KNOX HARDING, a citizen of the United States, and a resident of Woodlawn, city of Chicago, county of Cook, State of Illinois, have invented certain new and useful Improvements in Hydrocarbon Lighting Systems, of which the following is a specification, which will enable others familiar with the art to make and use the same, reference being had to the accompanying drawings, which form a part thereof.

My invention relates generally to hydrocarbon incandescent lighting systems, and more particularly to gasolene incandescent lights operating on what is known as the high-low system.

The principal object of my invention is to produce an efficient light from the various grades of gasolene, in such a manner that it can be operated for long periods of time without liability of deposits or accumulations of less volatile matter being formed to prevent or interfere with its continuous use.

My invention belongs to that class of lighting devices which are adapted to maintain themselves in a generated or heated condition over long periods of time when no light is required, so as to be in readiness to supply the full amount of light required as soon as an additional supply of fuel is turned on. Heretofore considerable difficulty has been encountered, preventing the attainment of the highest efficiency and economy in lamps of this kind. Where the small flame for generating and the large flame for lighting the mantle are both produced at the same burner gauze in the mantle and their relative size governed by varying the fuel supply, the relative proportions of fuel consumption respectively between the maximum and minimum is not very great. Some lamps of this class have been especially designed for the purpose of reducing the minimum by integrating the vaporizing tube with the burners and other highly heated parts in metallic heat conducting relation. A lamp of this construction will produce a small flame, suitable for maintaining a lamp at the generating temperature with less fuel consumption than would be required for a lamp designed solely for the production of light with the greatest efficiency.

As the best conditions of working in both high and low burnings are not identical, according to my invention I employ in combination in a lighting device, means for maintaining generation of the lamp most suitable for a small consumption of oil and means consisting of a modified arrangement and adjustment of the parts for the production of light, whereby the best construction for the production of light may be attained without sacrificing anything necessary to secure the maintenance of the lamp in a generated condition in the most economical manner.

Figure 2:
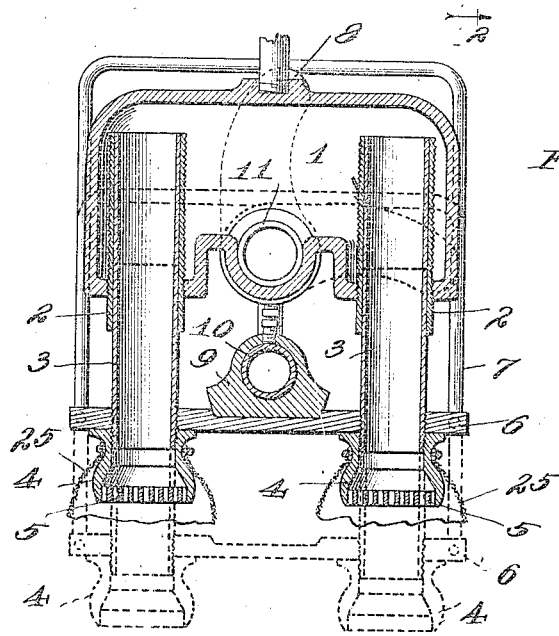
Figure 3:
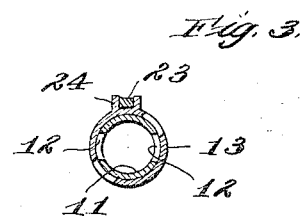

In the drawings which illustrate one form of my invention Figure 1 shows a vertical central section of the moving parts of a pendant lamp; Fig. 2 is a section on line 2—2 Fig. 1; and shows a section through the burner body its telescoping burner tubes the adjustable burners carried by the tubes a section of the stationary vaporizer and the heat collecting and conducting metal parts connected therewith; Fig. 3 is a section on line 3—3 of Fig. 1 and shows the air ports at the end of the Bunsen tube and the air inlet opening in the end of the rotating sleeve which acts as a shutter to regulate the air entering the Bunsen tube.

As shown in the drawing, the lamp is adapted to operate and permit a relative movement of its parts so as to conform to the requirements of two somewhat distinct sets of conditions. Among the desirable conditions when the lamp is burning low, the following may be mentioned: The vaporizing tubes must be kept hot enough at some one point to prevent fractional distillation of the mixed hydrocarbon of which commercial gasolene is composed; yet velocity of the flow of the vapor from the jet orifice should be lower and the percentage of air taken in with the mixture should be less than when used for incandescing a mantle, the Bunsen tube and passages through the metal parts of the burner body may be hotter, thus expanding and superheating the air and vapor without disadvantage as the gauze opening will permit, the passage of the necessary amount even when highly expanded and the heat absorbed by the mixture will be given off at the burner and help heat the vaporizing tube. A slower velocity of flow of the mixture will permit shorter passage to the burner and insure sufficient mixing, and the shorter passage may be through a hotter burner body, and the burner may be closer to the burner body. For obtaining the maximum efficiency in the production of light the vapor must be discharged from the jet at the maximum velocity obtainable. It must take in a fixed percentage of its weight of air and the mixture passed at as high velocity as possible through the burner and burned in contact with an incandescent mantle at a sufficiently high rate to insure that the quantity of combustible reaching the mantle in a given time is sufficient to raise the temperature as high as possible. The most perfect mixture is produced by passing the air and vapor at a high velocity through rather longer passages between the jet and burner and the mixture should not be expanded and have its calorific value reduced until it has passed through the burner openings to the mantle. The burner body and passages should preferably be farther removed from the burners.

As illustrated in the drawings the moving parts of the lamp are shown in the full lines in the position of the parts when the lamp is burning low.

The burner body 1 carries the telescoping sleeves, 2, which surround the downwardly extended burner tubes 3, adapted to slide therein. The burner tubes carry at their lower end the burners 4, having the perforated gauze 5, through which the gas mixture passes. The sliding burner tubes are also provided with a metal heat collecting and conducting piece 6, which is illustrated and shown in Fig. 2 to be attached to the lower end of the tubes and serves to raise and lower the burner body by means of the bail 7 which is acted on by the cam 8. When the lamp is burning in the position shown the flame will be small and close to the burner and may produce a small amount of light but its main function is to keep the burner and heat conducting piece 6 at a high temperature. In the position shown the heat conducting piece 6 will be in metallic contact with the heat conveying metal block 9 surrounding the vaporizing tube 10. The burner body 1 also carries the Bunsen tube 11 extending horizontally and terminating near the vapor discharge orifice. The outer end of the Bunsen tube is largely closed by the end of the valve which contains the vapor jet orifice. The Bunsen tube is provided at its sides near the jet orifice with air inlet ports 12 and is surrounded by a rotating sleeve 13, which is provided with similar air ports so that a partial rotation of the sleeve will open or close the air inlet passages through the ports.

In the operation of the lamp the liquid hydrocarbon enters through the pipe 14 and passes through the valve 15 into the vaporizing tube 10 where it is converted into vapor and the vapor passes through the lateral arm 16 to the jet orifice 17. The discharge from the jet orifice 17 is controlled by inserting or withdrawing a metallic wire about one one-thousandth of an inch smaller than the internal diameter of the orifice. This wire is carried at the end of a rod 18, which extends through suitable packing devices and is provided at its outer end with a screw threaded portion 19, having a very rapid pitch so that approximately a quarter of a revolution will produce motion enough to insert or withdraw the wire from the orifice. The screw 19 is provided on its outer end with a collar 20, having the arms 22 and 22 extending radially and carrying chains depending from their respective ends, so that by pulling down on the chain of arm 21, the collar 20 is rotated to the right and the wire is inserted into the orifice 17, thus reducing the flow. The collar 20 also carries an arm 23 extending inwardly parallel to the rod 18 which engages the sides of notch 24, projecting from the end of the rotating sleeve 13, which has an inlet opening, which in one position corresponds to the air inlet ports 12 and in this position acts as a shield to restrict the admission of air through the ports 12. It will, therefore, be understood that rotary motion will result in reducing the flow of vapor from the orifice and simultaneously reduce the admission of air to the Bunsen tube. The rotating sleeve 13 also carries the cam 8 which engages the upper portion of the bail 7 which supports the burner tubes 3 and the burners 4 so that a rotation of the sleeve and cam of about one-fourth of a revolution slides the burner tubes 3 within the telescoping tubes 2 carried by the burner body 1 and raises the burners 4 and mantles 29 into their upper position where they are in the most effective heat communicating relation to the vaporizing tube 10 and in metallic heat conducting relation therewith, through the heat conducting metal block 9, and the heat collecting and conducting piece 6. The rotation of the sleeve and shutter also partially closes the air admission ports 12 and reduces the air supply to the Bunsen tube.

In operating the lamp as by pulling down on the chain connecting arm 21, the various moving parts of the apparatus will be placed in the position best adapted for the maintenance of the lamp in a generated condition with a minimum consumption of fuel. It will be understood that by pulling the opposite chain connected with the arm 22, the vapor discharge orifice will be enlarged and the burners and mantles will be lowered into a position indicated by the dotted lines in Fig. 2, more favorable for the distribution of light. They will also be farther removed from the burner body 1 and tend to prevent excessive heating of the combustible mixture passing therethrough, and the mixture will have a somewhat greater length to travel before reaching the burners. The air ports will also be opened, permitting the full supply of air to the Bunsen tube.

The burners 4 may be of the usual construction having a perforated gauze 5 in its lower surface through which the gasolene mixture passes to the mantles and being adapted on its outer circumference to hold an inverted mantle 25 which may be tied on or secured to the burner in any suitable manner. The burner gauze may, however, be made with somewhat larger openings than those heretofore successfully used in lamps of ordinary construction because when the oil supply is reduced, the air supply is also simultaneously reduced to such an extent as to prevent the flame from flashing back through the gauze.

It is well known that the inflammability of a mixture of hydrocarbon and air as well as the rate of propagation of flame through such a mixture increases very rapidly as the percentage of air approaches the quantity necessary for the complete combustion of the hydrocarbon present in the mixture so that a highly explosive mixture cannot be advantageously used when supplied through gauze openings at a relatively slow velocity, as would be most advantageous to use for the maintenance of the relatively low temperature necessary to maintain a lamp in the generated condition, while for incandescing a mantle the highest velocities of flow and the most inflammable mixture conduce to the highest lighting efficiency.

Having now described my invention and illustrated one method by which it may be carried out; what I claim is:

1. In a device of the character described, a vaporizer and a burner, a jet orifice, a Bunsen tube, a burner body having channels therethrough and leading therefrom to the burner for conveying the mixture of vapor and air from said Bunsen tube to said burner, and means for simultaneously changing the flow of vapor and the distance of the burners from the said burner body.

2. In a device of the character described, an adjustable burner, a vaporizer having a jet orifice, a Bunsen tube, a burner body having passages therethrough for conveying the combustible mixture from the Bunsen tube to the said burners, and means for simultaneously increasing or decreasing the distance of the burners from the said burner body and increasing or decreasing the flow of vapor from said jet orifice.

3. In a device of the character described, adjustable burners, a vaporizer having a vapor jet orifice, a Bunsen tube, a burner body having passages therethrough for conveying a combustible mixture from the Bunsen tube to the burners in combination with means for simultaneously increasing or decreasing the distance of the burners from the said burner body and the vaporizer and the flow of vapor from the jet orifice.

4. In an apparatus of the character described, the combination of an adjustable burner, a vaporizer having a vapor jet orifice and means for controlling the flow of vapor therefrom, a Bunsen tube having air inlet ports and means for regulating the admission of air thereto, a burner body having passages therein for conveying the mixture from the Bunsen tube to the burners, and means for simultaneously increasing the flow of vapor and air and increasing the distance between said burner body and said burners and for simultaneously decreasing the flow of vapor, the admission of air and the distance between said burners and the burner body.

5. In an apparatus of the character described, comprising an adjustable burner, a vaporizer having a vapor jet orifice and means for controlling the flow of vapor therefrom, a Bunsen tube having air inlets, and means for regulating the admission of air thereto, a burner body having passages therein for conveying the mixture from the Bunsen tube to the burners, in combination with means for simultaneously increasing the flow of vapor and air and the distance between said burners and the said burner body and vaporizer or for simultaneously decreasing the flow of vapor, the admission of air and the distance between said burners and the burner body and said vaporizer.

In testimony whereof I affix my signature in the presence of two witnesses.

CHARLES KNOX HARDING.

Witnesses:
GRACE WATTS,
E. C. TRACY.